United States Patent
McFadyen et al.

(10) Patent No.: US 7,916,420 B1
(45) Date of Patent: Mar. 29, 2011

(54) DISK DRIVE EMPLOYING COMB FILTER FOR REPEATABLE FLY HEIGHT COMPENSATION

(75) Inventors: James P. R. McFadyen, Redwood City, CA (US); Bernhard E. Knigge, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 12/780,075

(22) Filed: May 14, 2010

(51) Int. Cl.
*G11B 21/02* (2006.01)
*G11B 27/36* (2006.01)

(52) U.S. Cl. .......................... 360/75; 360/31

(58) Field of Classification Search .......... None
See application file for complete search history.

(56) References Cited

U.S. PATENT DOCUMENTS

| | | | |
|---|---|---|---|
| 4,775,902 A | 10/1988 | Trovato et al. | |
| 4,777,544 A | 10/1988 | Brown et al. | |
| 4,804,894 A | 2/1989 | Machida et al. | |
| 4,839,754 A | 6/1989 | Gami et al. | |
| 5,130,866 A | 7/1992 | Klaassen et al. | |
| 5,168,413 A | 12/1992 | Coker et al. | |
| 5,377,058 A | 12/1994 | Good et al. | |
| 5,594,595 A | 1/1997 | Zhu | |
| 5,742,446 A | 4/1998 | Tian et al. | |
| 5,909,330 A | 6/1999 | Carlson et al. | |
| 5,949,605 A | 9/1999 | Lee et al. | |
| 6,008,640 A | 12/1999 | Tan et al. | |
| 6,052,243 A | 4/2000 | Shimada | |
| 6,097,559 A | 8/2000 | Ottesen et al. | |
| 6,175,456 B1 | 1/2001 | Yun | |
| 6,191,901 B1 | 2/2001 | Carlson et al. | |
| 6,268,976 B1 | 7/2001 | Carlson et al. | |
| 6,288,856 B1 | 9/2001 | Ottesen et al. | |
| 6,310,740 B1 | 10/2001 | Dunbar et al. | |
| 6,417,981 B1 | 7/2002 | Smith | |
| 6,452,735 B1 | 9/2002 | Egan et al. | |
| 6,459,539 B1 | 10/2002 | Carlson et al. | |
| 6,493,169 B1 | 12/2002 | Ferris et al. | |
| 6,501,606 B2 | 12/2002 | Boutaghou et al. | |
| 6,519,102 B1 | 2/2003 | Smith et al. | |
| 6,608,727 B2 | 8/2003 | Ottesen et al. | |
| 6,611,389 B1 | 8/2003 | Liu et al. | |
| 6,624,957 B1 | 9/2003 | Yun | |
| 6,671,110 B2 | 12/2003 | Baba et al. | |
| 6,674,590 B2 | 1/2004 | Ottesen et al. | |
| 6,678,108 B2 | 1/2004 | Smith et al. | |
| 6,700,724 B2 | 3/2004 | Riddering et al. | |
| 6,717,764 B2 | 4/2004 | Lake | |

(Continued)

OTHER PUBLICATIONS

Shiramatsu, et al., "Dynamically Controlled Thermal Flying-Height Control Slider", IEEE Transactions on Magnetics, vol. 44, No. 11, Nov. 2008, pp. 3695-3697.

*Primary Examiner* — Andrew L Sniezak

(57) ABSTRACT

A disk drive is disclosed comprising a head actuated over a disk comprising a plurality of tracks. The disk drive further comprises a fly height actuator operable to adjust a fly height of the head. A fly height measurement (FHM) is generated for the head, and a fly height error (FHE) is generated as a difference between the FHM and a target fly height. A comb filter is used to generate fly height compensation values in response to the FHE, and a fly height control signal is generated in response to the FHE and the fly height compensation values, wherein the fly height control signal is applied to the fly height actuator.

18 Claims, 5 Drawing Sheets

U.S. PATENT DOCUMENTS

| | | |
|---|---|---|
| 6,735,027 B2 | 5/2004 | Helsel et al. |
| 6,762,899 B2 | 7/2004 | Ottesen et al. |
| 6,765,745 B2 | 7/2004 | Smith et al. |
| 6,785,081 B2 | 8/2004 | Chapin et al. |
| 6,798,605 B2 | 9/2004 | Kurita et al. |
| 6,801,376 B2 | 10/2004 | Smith |
| 6,822,816 B2 | 11/2004 | Dakroub |
| 6,865,040 B2 | 3/2005 | Fayeulle et al. |
| 6,894,854 B1 | 5/2005 | Carlson et al. |
| 6,930,844 B2 | 8/2005 | Yeh et al. |
| 6,980,383 B2 | 12/2005 | Brunnett et al. |
| 6,992,853 B2 | 1/2006 | Chang |
| 7,016,131 B2 | 3/2006 | Liu et al. |
| 7,023,647 B2 | 4/2006 | Bloodworth et al. |
| 7,038,875 B2 | 5/2006 | Lou et al. |
| 7,046,463 B2 | 5/2006 | Gay Sam et al. |
| 7,068,449 B2 | 6/2006 | Riddering et al. |
| 7,068,451 B1 | 6/2006 | Wang et al. |
| 7,068,457 B2 | 6/2006 | Riddering et al. |
| 7,092,195 B1 | 8/2006 | Liu et al. |
| 7,095,578 B2 | 8/2006 | Ma |
| 7,158,325 B1 | 1/2007 | Hu et al. |
| 7,180,692 B1 | 2/2007 | Che et al. |
| 7,215,500 B1 | 5/2007 | Albrecht et al. |
| 7,253,984 B1 | 8/2007 | Patapoutian et al. |
| 7,265,933 B1 | 9/2007 | Phan et al. |
| 7,271,975 B2 | 9/2007 | Shimizu et al. |
| 7,324,299 B1 | 1/2008 | Schreck et al. |
| 7,359,138 B1 | 4/2008 | Albrecht et al. |
| 7,369,340 B1 | 5/2008 | Dang et al. |
| 7,375,914 B1 | 5/2008 | Dieron et al. |
| 7,376,182 B2 | 5/2008 | Kris |
| 7,426,090 B2 | 9/2008 | Yamashita et al. |
| 7,450,333 B2 | 11/2008 | Hirano et al. |
| 7,457,072 B2 | 11/2008 | Dieron et al. |
| 7,583,466 B2 | 9/2009 | Kermiche et al. |
| 7,605,997 B2 | 10/2009 | Yamazaki |
| 7,675,707 B1 | 3/2010 | Liu et al. |
| 7,839,595 B1 * | 11/2010 | Chue et al. ............ 360/75 |
| 2002/0167745 A1 | 11/2002 | Ottesen et al. |
| 2003/0002183 A1 | 1/2003 | Fioravanti |
| 2003/0043491 A1 | 3/2003 | Riddering et al. |
| 2003/0133220 A1 | 7/2003 | Hsin |
| 2003/0184899 A1 | 10/2003 | Gay Sam et al. |
| 2003/0184907 A1 | 10/2003 | Li et al. |
| 2003/0218813 A1 | 11/2003 | Dakroub |
| 2004/0075940 A1 | 4/2004 | Bajorek et al. |
| 2005/0128630 A1 | 6/2005 | Huang et al. |
| 2006/0158769 A1 * | 7/2006 | Ono et al. ............ 360/75 |
| 2006/0268445 A1 | 11/2006 | Brannon et al. |
| 2007/0127148 A1 | 6/2007 | Yokohata et al. |
| 2007/0211368 A1 | 9/2007 | Shibano et al. |
| 2007/0268615 A1 | 11/2007 | McFadyen et al. |
| 2008/0130159 A1 | 6/2008 | Dieron et al. |
| 2008/0165446 A1 | 7/2008 | Partee |
| 2008/0239547 A1 | 10/2008 | Okamura |
| 2009/0141390 A1 | 6/2009 | Oyamada et al. |
| 2009/0195912 A1 | 8/2009 | Sato |

\* cited by examiner

DISK DRIVE EMPLOYING COMB FILTER FOR REPEATABLE FLY HEIGHT COMPENSATION

BACKGROUND

Description of the Related Art

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Because the disk is rotated at a constant angular velocity, the data rate is typically increased toward the outer diameter tracks (where the surface of the disk is spinning faster) in order to achieve a more constant linear bit density across the radius of the disk. To simplify design considerations, the data tracks are typically banded together into a number of physical zones, wherein the data rate is constant across a zone, and increased from the inner diameter zones to the outer diameter zones. This is illustrated in FIG. 1, which shows a prior art disk format 2 comprising a number of data tracks 4, wherein the data tracks are banded together to form a plurality of zones.

The prior art disk format of FIG. 1 also comprises a number of servo sectors $6_0$-$6_N$ recorded around the circumference of each data track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector 6, further comprises groups of servo bursts 14 (e.g., A, B, C and D bursts), which comprise a number of consecutive transitions recorded at precise intervals and offsets with respect to a data track centerline. The groups of servo bursts 14 provide fine head position information used for centerline tracking while accessing a data track during write/read operations.

An air bearing forms between the head and the disk due to the disk rotating at high speeds. Since the quality of the write/read signal depends on the fly height of the head, conventional heads (e.g., magnetoresistive heads) may comprise an actuator for controlling the fly height. Any suitable fly height actuator may be employed, such as a heater which controls fly height through thermal expansion, or a piezoelectric (PZT) actuator. It is desirable to determine the appropriate fly height actuator control signal (e.g., appropriate current applied to a heater) that achieves the target fly height for the head.

DETAILED DESCRIPTION OF EMBODIMENTS OF THE INVENTION

Figure 2A:
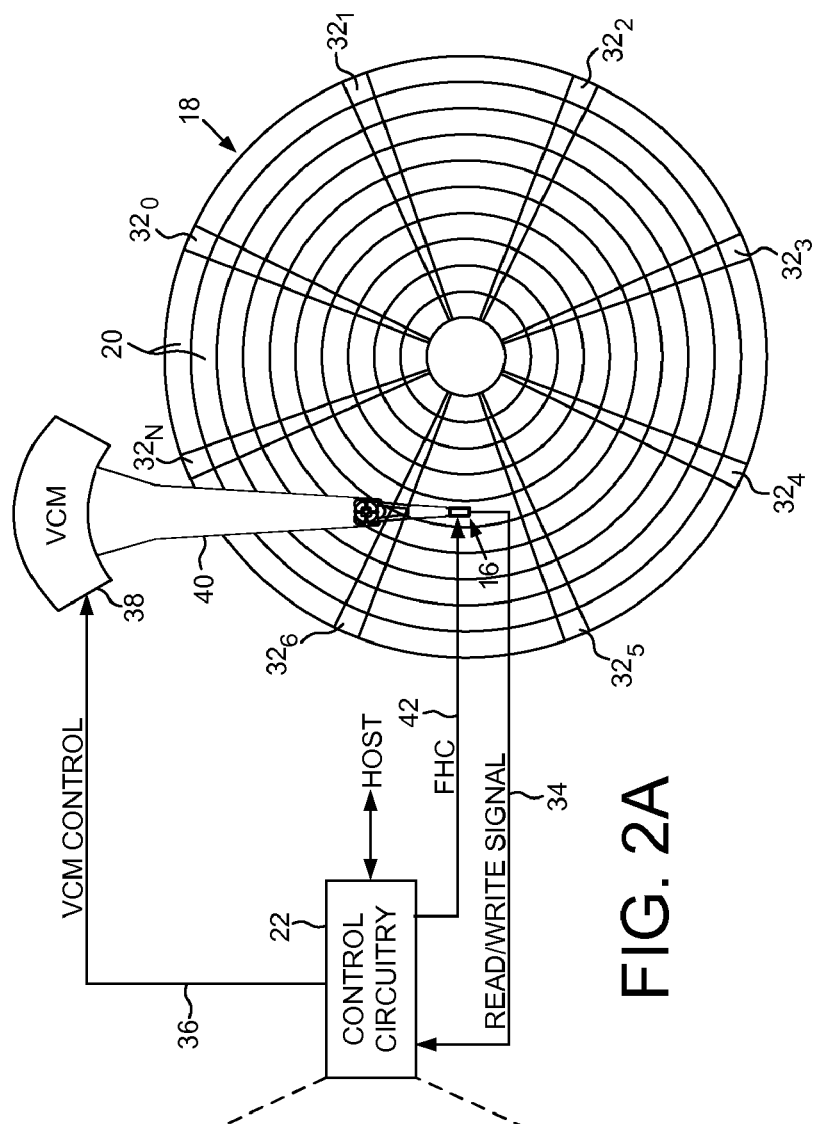
FIG. 2A shows a disk drive according to an embodiment of the present invention comprising a head actuated over a disk and control circuitry.
Figure 2B:
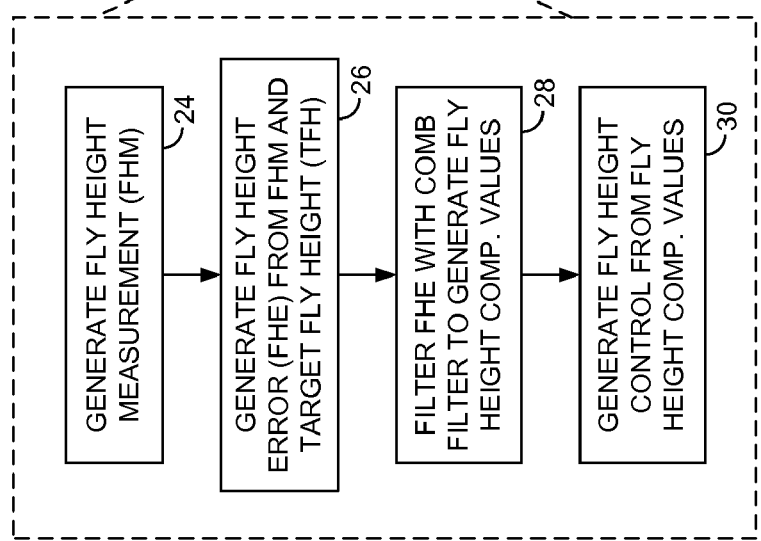
FIG. 2B is a flow diagram executed by the control circuitry according to an embodiment of the present invention wherein a comb filter generates fly height compensation values.

FIG. 2A shows a disk drive according to an embodiment of the present invention comprising a head 16 actuated over a disk 18 comprising a plurality of tracks 20. The disk drive further comprises a fly height actuator operable to adjust a fly height of the head 16, and control circuitry 22 operable to execute the flow diagram of FIG. 2B to generate a fly height control signal. A fly height measurement (FHM) is generated for the head (step 24), and a fly height error (FHE) is generated as a difference between the FHM and a target fly height (step 26). A comb filter is used to generate fly height compensation values (step 28) in response to the FHE, and a fly height control signal is generated in response to the FHE and the fly height compensation values (step 30), wherein the fly height control signal is applied to the fly height actuator.

In the embodiment of FIG. 2A, the data tracks 20 are defined by a plurality of embedded servo sectors $32_0$-$32_N$. As the head 16 passes over a servo sector, the control circuitry 22 demodulates the read signal 34 into a position error signal (PES). The PES is filtered by a suitable compensation filter to generate a control signal 36 applied to a voice coil motor (VCM) 38. The VCM 38 rotates an actuator arm 40 about a pivot in order to position the head 16 radially over the disk 18 in a direction that reduces the PES.

In the embodiments of the present invention, a suitable fly height actuator is integrated with the head 16, such as a suitable heater or piezoelectric actuator. The control circuitry 22 generates a fly height control (FHC) signal 42 applied to the fly height actuator in order to maintain the head 16 at a target fly height while writing data to and reading data from the disk 18. The control circuitry 22 generates the FHC signal 42 in response to the fly height compensation values generated using the comb filter, and in one embodiment, the control circuitry 22 generates feed-forward compensation values using the comb filter which are used to generate the FHC signal 42.

Figure 3A:
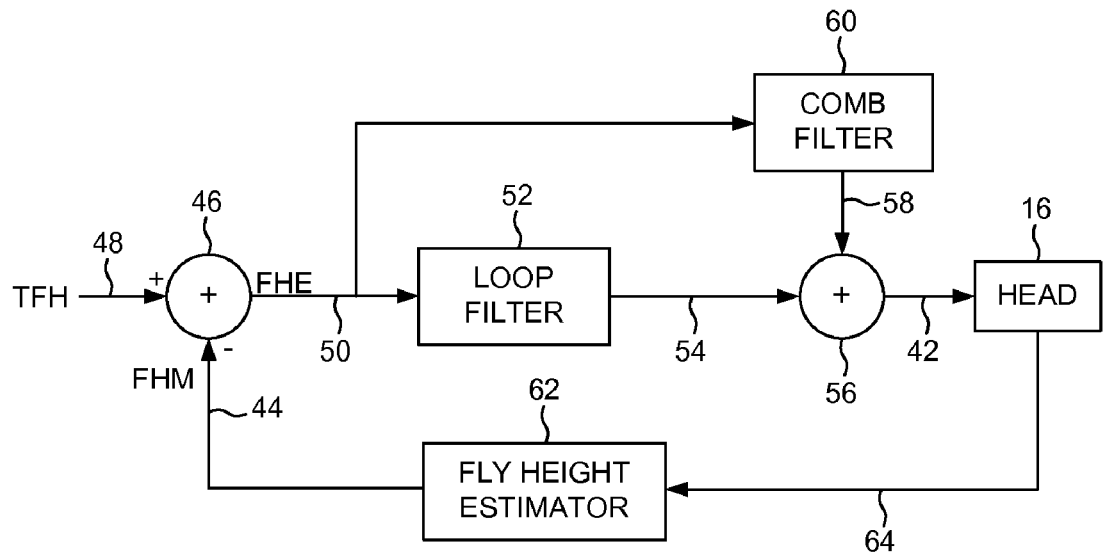
FIG. 3A shows control circuitry according to an embodiment of the present invention for adapting the comb filter using an input to a loop filter.
Figure 3B:
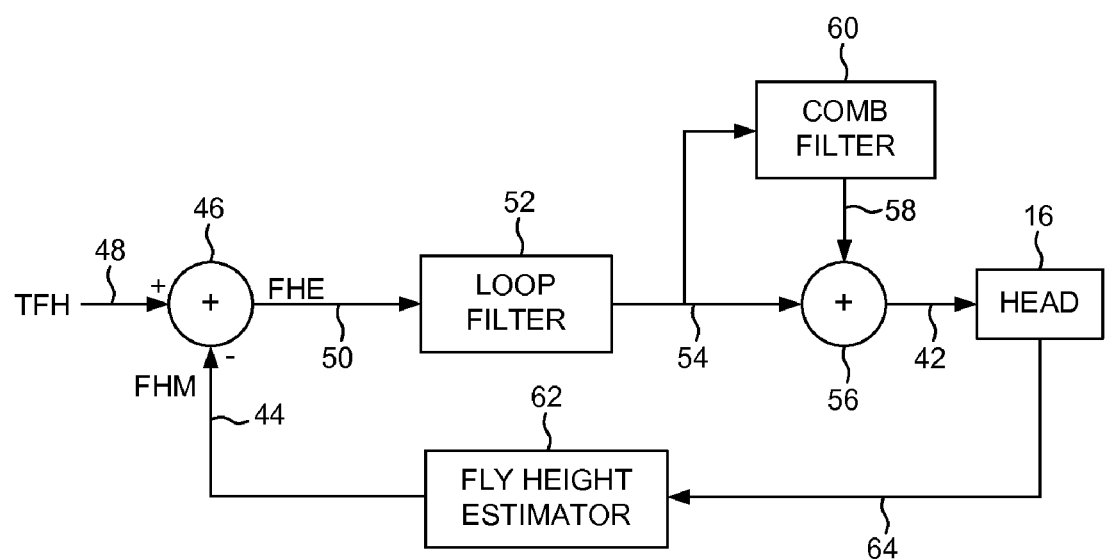
FIG. 3B shows control circuitry according to an embodiment of the present invention for adapting the comb filter using an output of a loop filter.

FIGS. 3A and 3B show embodiments of control circuitry wherein a fly height measurement (FHM) 44 is subtracted 46 from a target fly height (TFH) 48 to generate a fly height error (FHE) 50. A loop filter 52 filters the FHE 50 to generate a control signal 54 which is added 56 to a feed-forward compensation value 58 generated by a comb filter 60 to thereby generate the FHC 42 applied to the fly height controller integrated with the head 16. A fly height estimator 62 processes a signal 64 that is indicative of the fly height in order to generate the FHM 44. The fly height estimator 62 may implement any suitable algorithm to generate the FHM 44, such as processing a capacitance 64 measured between the head 16 and the disk 18 which is indicative of fly height. In another embodiment, the fly height estimator 62 may processes a read signal 64 emanating from the head 16 while reading a test pattern from the disk to generate the FHM 44 (e.g., using a harmonic ratio method and/or an overwrite method). In one embodiment, a fly height measurement is generated for each servo sector and therefore the fly height adjusted at a sampling rate equal to the frequency of servo sectors.

In the embodiment of FIG. 3A, a comb filter 60 is adapted in response to the FHE 50 input into the loop filter 52 until the feed-forward compensation values 58 converge to acceptable values. In the alternative embodiment of FIG. 3B, the comb filter 60 is adapted in response to the control signal 54 output by the loop filter 52 until the feed-forward compensation values 58 converge to acceptable values. In one embodiment, the comb filter 60 is adapted during a calibration procedure while reading a test pattern from the disk. After the feed-forward compensation values 58 converge, the input to the comb filter 60 is disabled so that the comb filter 60 does not adapt during normal operation. In another embodiment, the comb filter 60 may be adapted continuously during normal operation so that the feed-forward compensation values 58 adapt, for example, to changes in environmental conditions (e.g., changes in temperature).

Figure 4A:
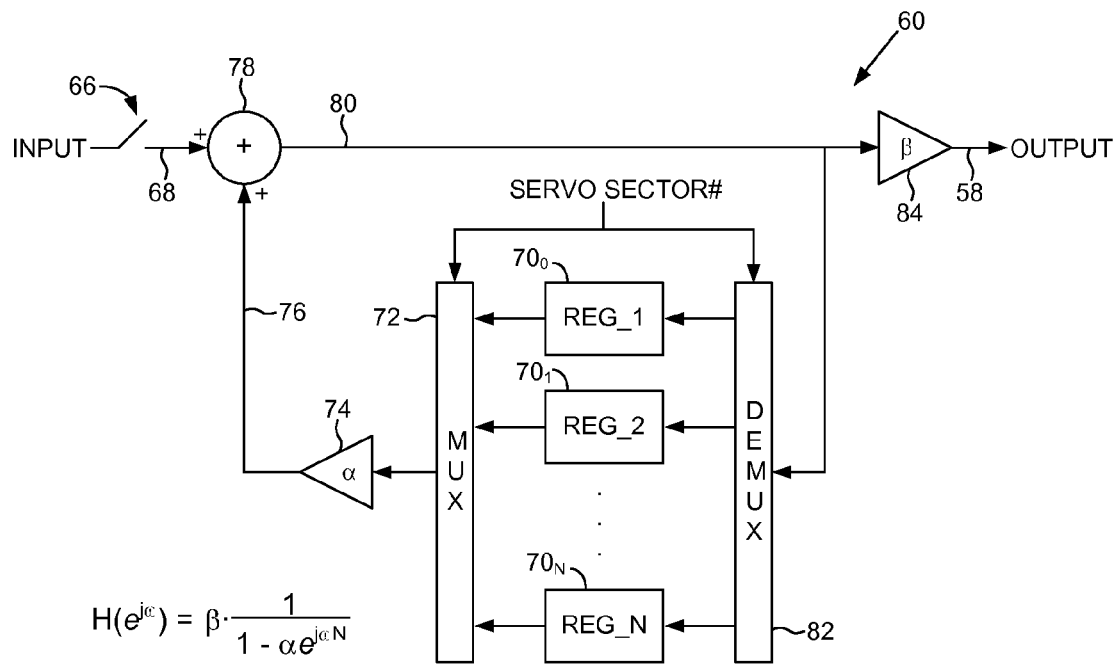
FIG. 4A shows a comb filter according to an embodiment of the present invention comprising a circular buffer of registers, wherein each register corresponds to a servo sector.

FIG. 4A shows control circuitry for implementing the comb filter 60 according to an embodiment of the present invention. In this embodiment, a switch 66 enables the input 68 of the comb filter 60 when adapting the feed-forward compensation values 58, and disables the input of the comb filter 60 once the feed-forward compensation values 58 converge to acceptable values. The comb filter 60 comprises N registers $70_0$-$70_N$ wherein each of the registers 70, corresponds to one of the N servo sectors 32, (FIG. 2A). When the head passes over a servo sector $32_i$, a multiplexer 72 applies the content of the corresponding register 70, to a first coefficient α 74 the output 76 of which is added 78 to the input 68. The output 80 of the adder 78 is routed by demultiplexer 82 back to the input of the corresponding register $70_i$. The output 80 of the adder 78 is also multiplied by a second coefficient β 84 to generate the feed-forward compensation value for the servo sector $32_i$. This process is repeated for each of the N servo sectors over a revolution of the disk. At the end of the revolution, the processes repeats by circling back to the first register $70_0$. The process is repeated over a number of disk revolutions until the feedforward compensation values 58 converge to acceptable values, after which the switch 66 disables the input of the comb filter 60. During normal operation, as the head passes over each servo sector $32_i$, the multiplexer 72 applies the output of the corresponding register $70_i$ to the first coefficient α 74 which is then amplified by the second coefficient β 84 to generate the corresponding feed-forward compensation value 58 for the servo sector $32_i$.

Figure 4B:
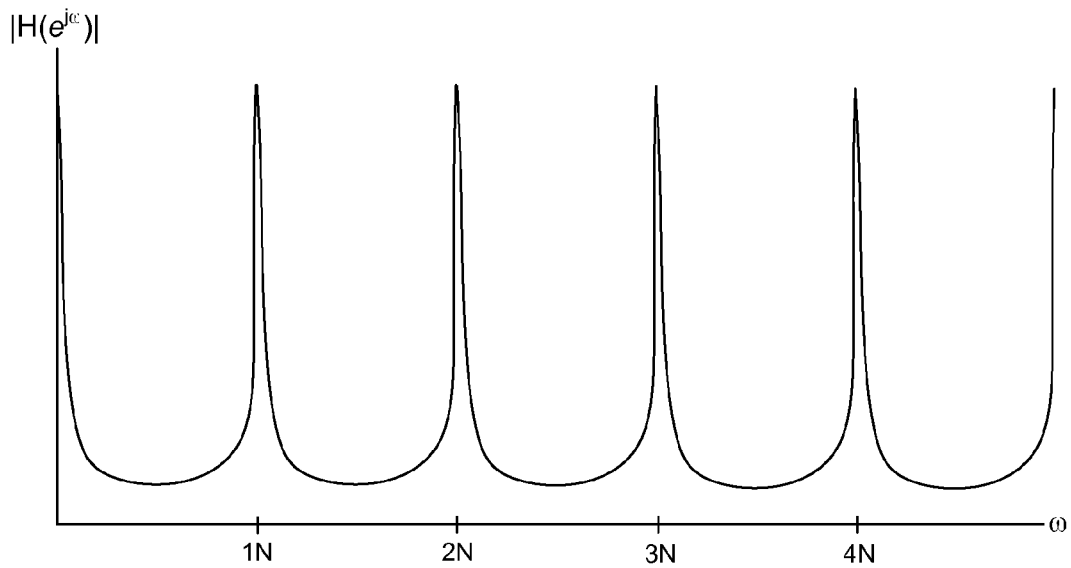
FIG. 4B shows a magnitude of a frequency response of a comb filter according to an embodiment of the present invention.

FIG. 4A shows the frequency response H($e^{j\omega}$) of the comb filter 60, and FIG. 4B shows an example magnitude of the frequency response, where 1/N represents a rotation frequency of the disk. In this embodiment, the magnitude of the comb filter frequency response comprises a plurality of peaks for extracting the rotation frequency from the FHE (1N) and harmonics (2N, 3N, . . . ) of the rotation frequency from the FHE. In one embodiment, at least one of the β and α coefficients is adjusted in order to adjust at least one of a width and magnitude of the peaks. In one embodiment, at least one of the β and α coefficients are also adjusted within predetermined limits to achieve stability. In the embodiment of FIG. 4A, the first coefficient α 74 adjusts a width and magnitude of the peaks (wherein α 74 is a fractional value between 0 and 1), whereas the second coefficient β 84 adjusts only the magnitude of the peaks.

Figure 5:
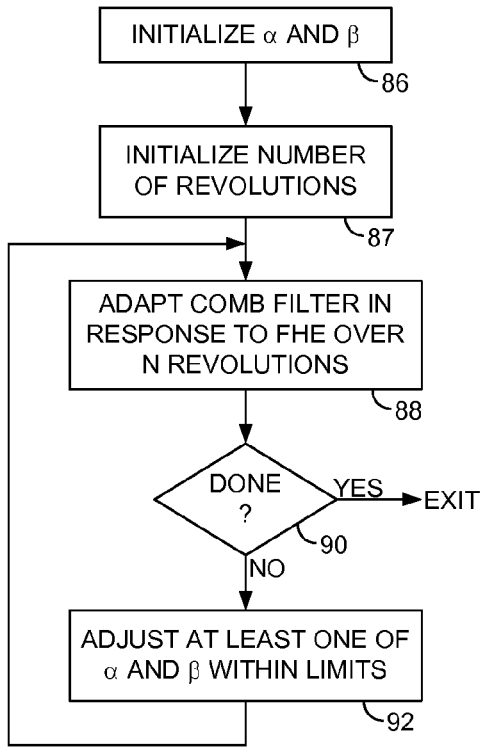
FIG. 5 is a flow diagram according to an embodiment of the present invention wherein at least one of an α and β coefficients in the comb filter is adjusted to achieve a desired performance while maintaining stability.

FIG. 5 shows a flow diagram according to an embodiment of the present invention for calibrating the β and α coefficients, wherein the β and α coefficients are first initialized (step 86), for example, to nominal values. A number of revolutions is also initialized (step 87) for adapting the comb filter. The comb filter is then adapted over the number of revolutions (step 88) after which the FHE is evaluated (e.g., average compared to a threshold) to determine whether the feed-forward compensation values have converged to acceptable values (step 90). In one embodiment, the process may end early if the FHE falls below the threshold before finishing the number of revolutions. If after the number of revolutions the FHE has not fallen below the threshold (step 90), at least one of the β and α coefficients are adjusted (step 92), for example, to increase the amplitude and/or width of the peaks in the frequency response of FIG. 4B. The flow diagram is then repeated from step 88 until acceptable values for the β and α coefficients have been determined.

In one embodiment, the β and α coefficients are adjusted at step 92 within predetermined limits that ensure the fly height control loop remains stable. If the β and α coefficients reach their limits after being adjusted at step 92, in one embodiment the number of revolutions for adapting the comb filter at step 88 is increased, the β and α coefficients are reset to nominal values, and the calibration procedure is repeated until acceptable values for the β and α coefficients are determined.

Figure 1:
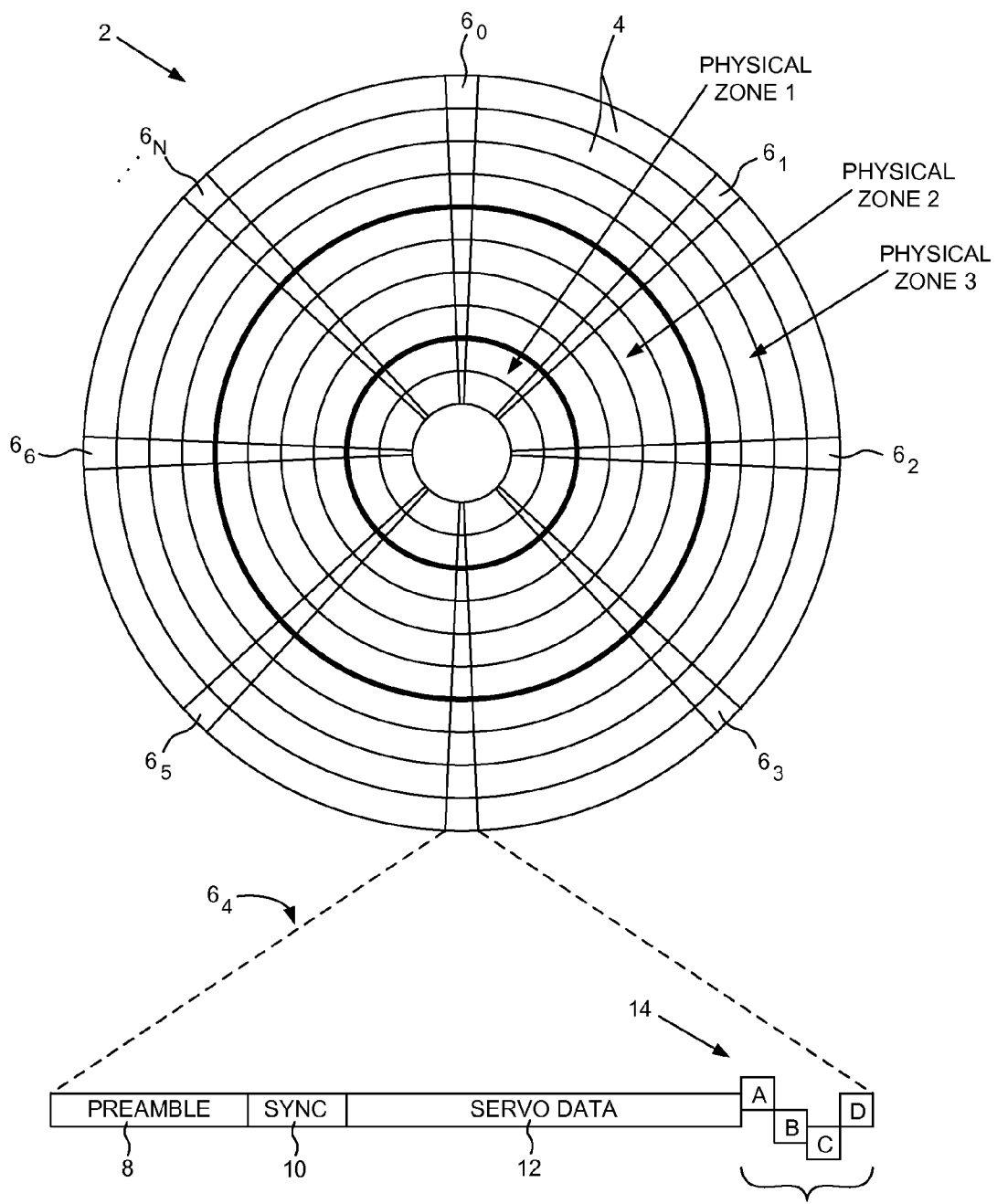
FIG. 1 shows a prior art disk format comprising a plurality of tracks defined by embedded servo sectors.

In one embodiment, the flow diagram of FIG. 5 is executed in order to calibrate the β and α coefficients for a number of different radial locations on the disk, such as for each physical zone (FIG. 1). During normal operation when the head crosses over a calibration boundary, the β and α coefficients are programmed with the corresponding values, and the registers $70_0$-$70_N$ of the comb filter 60 are loaded with the corresponding values.

In another embodiment, the comb filter may be recalibrated over the life of the disk drive in response to changes in operating conditions. For example, the comb filter may be recalibrated if environmental conditions change (e.g., ambient temperature, altitude, etc.) which may affect the fly height of the head. In one embodiment, when recalibrating the comb filter the previously calibrated values for the β and α coefficients are used to adapt the comb filter over a number of revolutions. If the number of revolutions required to adapt the comb filter exceeds a threshold (i.e., if it takes too long to adapt the comb filter), the flow diagram of FIG. 5 may be re-executed to recalibrate the β and α coefficients to values better suited to the new operating conditions.

The comb filter 60 of FIG. 4A may be implemented using any suitable technique, and may comprise alternative configurations. For example, the first coefficient α 74 may be positioned at the input of the registers $70_0$-$70_N$ rather than the output. In addition, the registers $70_0$-$70_N$ may be implemented in any suitable manner, such as with a circular buffer or other addressable memory. In other embodiments, the comb filter may be implemented in firmware executed by a microprocessor. Accordingly, the particular comb filter shown in FIG. 4A is illustrative, but any suitable implementation may be employed in the embodiments of the present invention.

Figure 6:
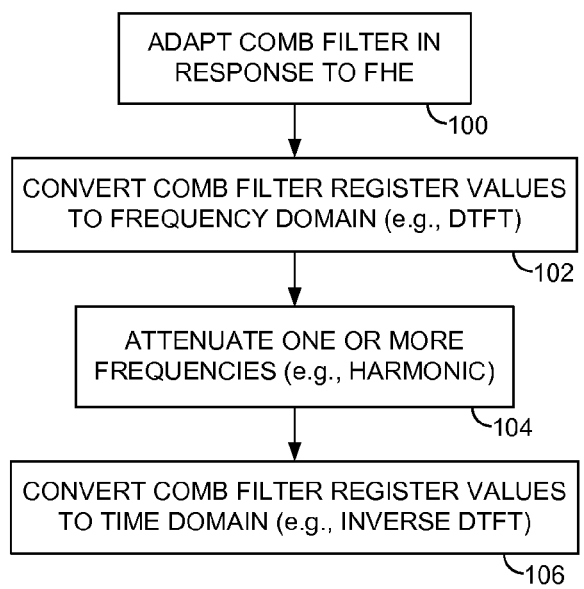
FIG. 6 is a flow diagram according to an embodiment of the present invention wherein the values stored in the registers of the comb filter are post processed to attenuate one or more frequencies in the fly height compensation values.

FIG. 6 shows an embodiment of the present invention wherein the fly height compensation values generated by the comb filter may be post processed to attenuate one or more frequencies, such as one of the harmonics of the rotation frequency. After adapting the comb filter (step 100), the values stored in the registers 70₀-70_N are converted into the frequency domain (step 102), for example, by computing a Discrete-Time Fourier Transform (DTFT). One or more frequencies are then attenuated in the frequency domain (step 104), for example, by attenuating one or more harmonics of the rotation frequency. The frequency domain is then converted back into the time domain (e.g., by computing an inverse DTFT) and the register values restored (step 106).

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain steps described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising a plurality of tracks;
   a head actuated over the disk;
   a fly height actuator operable to adjust a fly height of the head; and
   control circuitry operable to:
      generate a fly height measurement (FHM) for the head;
      generate a fly height error (FHE) as a difference between the FHM and a target fly height;
      using a comb filter to generate fly height compensation values in response to the FHE;
      generate a fly height control signal in response to the FHE and the fly height compensation values; and
      apply the fly height control signal to the fly height actuator.

2. The disk drive as recited in claim 1, wherein the control circuitry is operable to generate the fly height control signal from a feed-forward compensation value generated in response to the fly height compensation values.

3. The disk drive as recited in claim 1, wherein the control circuitry is operable to adjust the FHE in response to the fly height compensation values.

4. The disk drive as recited in claim 1, wherein:
   each track comprises N servo sectors;
   the comb filter comprises N registers each corresponding to a servo sector; and
   one of the fly height compensation values is generated for each servo sector in response to a value stored in the corresponding register of the comb filter.

5. The disk drive as recited in claim 4, wherein the comb filter comprises a frequency response comprising:

$$H(e^{j\omega})\beta \cdot \frac{1}{1-\alpha e^{j\omega N}}$$

wherein 1/N represents a rotation frequency of the disk.

6. The disk drive as recited in claim 5, wherein a magnitude of the comb filter frequency response extracts the rotation frequency from the FHE and harmonics of the rotation frequency from the FHE.

7. The disk drive as recited in claim 1, wherein the control circuitry is operable to:
   generate the fly height compensation values over multiple disk revolutions; and
   after generating the fly height compensation values, post process the fly height compensation values to attenuate a frequency.

8. The disk drive as recited in claim 7, wherein the attenuated frequency comprises a harmonic of a rotation frequency of the disk.

9. A method of operating a disk drive comprising a head actuated over a disk comprising a plurality of tracks, and a fly height actuator operable to adjust a fly height of the head, the method comprising:
   generating a fly height measurement (FHM) for the head;
   generating a fly height error (FHE) as a difference between the FHM and a target fly height;
   using a comb filter to generate fly height compensation values in response to the FHE;
   generating a fly height control signal in response to the FHE and the fly height compensation values; and
   applying the fly height control signal to the fly height actuator.

10. The method as recited in claim 9, further comprising generating the fly height control signal from a feed-forward compensation value generated in response to the fly height compensation values.

11. The method as recited in claim 9, further comprising adjusting the FHE in response to the fly height compensation values.

12. The method as recited in claim 9, wherein:
   each track comprises N servo sectors;
   the comb filter comprises N registers each corresponding to a servo sector; and
   one of the fly height compensation values is generated for each servo sector in response to a value stored in the corresponding register of the comb filter.

13. The method as recited in claim 12, wherein the comb filter comprises a frequency response comprising:

$$H(e^{j\omega})\beta \cdot \frac{1}{1-\alpha e^{j\omega N}}$$

wherein 1/N represents a rotation frequency of the disk.

14. The method as recited in claim 13, wherein a magnitude of the comb filter frequency response comprises a plurality of peaks for extracting the rotation frequency from the FHE and harmonics of the rotation frequency from the FHE.

15. The method as recited in claim 14, further comprising adjusting at least one of the β and α coefficients to adjust at least one of a width and magnitude of the peaks.

16. The method as recited in claim 15, further comprising adjusting at least one of the β and α coefficients within predetermined limits to achieve stability.

17. The method as recited in claim 9, further comprising:
generating the fly height compensation values over multiple disk revolutions; and
after generating the fly height compensation values, post processing the fly height compensation values to attenuate a frequency.

18. The method as recited in claim 17, wherein the attenuated frequency comprises a harmonic of a rotation frequency of the disk.

* * * * *